United States Patent
Liu (10) Patent No.: US 12,507,393 B2
(45) Date of Patent: Dec. 23, 2025

(54) SEMICONDUCTOR DEVICE INCLUDING ACTIVE PILLARS MADE OF THREE SEMICONDUCTOR LAYERS, METHOD FOR OPERATING SAME, AND SEMICONDUCTOR STRUCTURE

(71) Applicant: CHANGXIN MEMORY TECHNOLOGIES, INC., Hefei (CN)

(72) Inventor: Youming Liu, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 408 days.

(21) Appl. No.: 18/161,130

(22) Filed: Jan. 30, 2023

(65) Prior Publication Data

US 2024/0049446 A1    Feb. 8, 2024

Related U.S. Application Data

(63) Continuation of application No. PCT/CN2022/118611, filed on Sep. 14, 2022.

(30) Foreign Application Priority Data

Aug. 2, 2022 (CN) .......................... 202210923404.2
Aug. 19, 2022 (CN) .......................... 202210997895.5

(51) Int. Cl.
H10B 12/00 (2023.01)
G11C 11/409 (2006.01)
H01L 23/528 (2006.01)

(52) U.S. Cl.
CPC ............ *H10B 12/20* (2023.02); *G11C 11/409* (2013.01); *H01L 23/5283* (2013.01); *H10B 12/482* (2023.02); *H10B 12/488* (2023.02)

(58) Field of Classification Search
CPC .... H10B 12/20; H10B 12/482; H10B 12/488; G11C 11/409; G11C 2211/4016; H01L 23/5283
(Continued)

(56) References Cited

U.S. PATENT DOCUMENTS 8,391,081 B2   3/2013 Bawedin
11,398,485 B2   7/2022 Shin et al.
(Continued)

FOREIGN PATENT DOCUMENTS

CN   103824861 A   5/2014
CN   112397517 A   2/2021

*Primary Examiner* — Duy T Nguyen
(74) *Attorney, Agent, or Firm* — Syncoda LLC; Feng Ma (57) ABSTRACT

A semiconductor device, including: a substrate; an active pillar array structure located on the substrate; and a plurality of first word lines and a plurality of second word lines. The active pillar array structure includes a plurality of active pillars arrayed in a second direction and a third direction, each active pillar extends in a first direction. The active pillar includes a first semiconductor layer, a second semiconductor layer and a third semiconductor layer stacked sequentially in the second direction. The first word lines and the second word lines extend in the third direction. Each active pillar arranged in the third direction corresponds to a respective first word line and a respective second word line. Each first word line covers the first semiconductor layer in the respective active pillar, and each second word line covers the third semiconductor layer in the respective active pillar.

18 Claims, 4 Drawing Sheets

(58) Field of Classification Search
USPC .......................................................... 257/295
See application file for complete search history.

(56) References Cited

U.S. PATENT DOCUMENTS

| | | | |
|---|---|---|---|
| 2006/0289940 A1* | 12/2006 | Hyun | H10D 30/62 |
| | | | 257/369 |
| 2007/0158736 A1* | 7/2007 | Arai | H10B 43/27 |
| | | | 257/E21.679 |
| 2016/0315085 A1* | 10/2016 | Choi | H10D 84/038 |
| 2020/0111811 A1* | 4/2020 | Chae | H10D 64/118 |
| 2021/0057419 A1* | 2/2021 | Shin | H10B 12/30 |

* cited by examiner

SEMICONDUCTOR DEVICE INCLUDING ACTIVE PILLARS MADE OF THREE SEMICONDUCTOR LAYERS, METHOD FOR OPERATING SAME, AND SEMICONDUCTOR STRUCTURE

CROSS-REFERENCE TO RELATED APPLICATIONS

This is a continuation of International Patent Application No. PCT/CN2022/118611, filed on Sep. 14, 2022, which claims priority to Chinese patent application No. 202210923404.2, filed on Aug. 2, 2022, and Chinese patent application No. 202210997895.5, filed on Aug. 19, 2022. The disclosures of International Patent Application No. PCT/CN2022/118611, Chinese patent application No. 202210923404.2, and Chinese patent application No. 202210997895.5 are hereby incorporated by reference in their entireties.

BACKGROUND

A semiconductor structure, such as a Dynamic Random Access Memory (DRAM), usually has a basic memory unit of 1T1C (one transistor-one capacitor).

Moreover, in a semiconductor structure having a basic memory cell of 1T0C (one transistor-zero capacitor), a float body effect is usually used to store charges to cause threshold voltage shift (Vt shift), so as to distinguish whether a memory state is "1" or "0".

SUMMARY

The present disclosure relates to the field of semiconductors, and in particular to a semiconductor device, a method for operating the semiconductor device, and a semiconductor structure.

Embodiments of the disclosure provide a semiconductor device, which includes: a substrate; an active pillar array structure located on the substrate; a plurality of first word lines and a plurality of second word lines. The active pillar array structure includes a plurality of active pillars arrayed in a second direction and a third direction, and each of the plurality of active pillars extends in a first direction. The first direction is parallel to a substrate plane, the second direction is parallel to the substrate plane and perpendicular to the first direction, and the third direction is perpendicular to the substrate plane. Each of the plurality of active pillars includes a first semiconductor layer, a second semiconductor layer and a third semiconductor layer stacked sequentially in the second direction. The plurality of first word lines and the plurality of second word lines extend in the third direction, each column of the active pillars arranged in the third direction corresponds to a respective one of the plurality of first word lines and a respective one of the plurality of second word lines, each of the plurality of first word lines covers the first semiconductor layer in the active pillar corresponding to the first word line, and each of the plurality of second word lines covers the third semiconductor layer in the active pillar corresponding to the second word line.

The embodiments of the disclosure also provide a semiconductor structure, which includes a semiconductor device array. The semiconductor device array includes a plurality of semiconductor devices. The semiconductor device includes: a substrate; an active pillar array structure located on the substrate; a plurality of first word lines and a plurality of second word lines. The active pillar array structure includes a plurality of active pillars arrayed in a second direction and a third direction, and each of the plurality of active pillars extends in a first direction. The first direction is parallel to a substrate plane, the second direction is parallel to the substrate plane and perpendicular to the first direction, and the third direction is perpendicular to the substrate plane. Each of the plurality of active pillars includes a first semiconductor layer, a second semiconductor layer and a third semiconductor layer stacked sequentially in the second direction. The plurality of first word lines and the plurality of second word lines extend in the third direction, each column of the active pillars arranged in the third direction corresponds to a respective one of the plurality of first word lines and a respective one of the plurality of second word lines, each of the plurality of first word lines covers the first semiconductor layer in the active pillar corresponding to the first word line, and each of the plurality of second word lines covers the third semiconductor layer in the active pillar corresponding to the second word line.

The embodiments of the disclosure also provide a method for operating a semiconductor device. The semiconductor device includes a plurality of transistors, and a respective first word line and a respective second word line electrically connected to each of the plurality of transistors. The method includes that: a to-be-programmed or to-be-read transistor is selected, a first voltage is applied to the first word line electrically connected to the to-be-programmed or to-be-read transistor, and a second voltage is applied to the second word line electrically connected to the to-be-programmed or to-be-read transistor. The second voltage is greater than a turn-on voltage of the transistor, and voltage directions of the first voltage and the second voltage are opposite.

BRIEF DESCRIPTION OF THE DRAWINGS

Details of one or more embodiments of the present disclosure are set forth in the following drawings and descriptions. Other features and advantages of the present disclosure will become apparent from the specification, drawings, and claims.

In order to describe the technical solutions in the embodiments of the disclosure more clearly, the drawings used in the embodiments will be simply introduced below. It is apparent that the drawings described below merely illustrate some embodiments of the disclosure, and other drawings may further be obtained by those of ordinary skill in the art according to the drawings without creative efforts.

DETAILED DESCRIPTION

Exemplary implementations of the disclosure will be described below more comprehensively with reference to the drawings. Although the exemplary implementations of the disclosure are shown in the drawings, it should be understood that, the disclosure may be implemented in various forms and should not be limited by the specific implementations elaborated herein. On the contrary, these implementations are provided to facilitate a more thorough understanding of the disclosure, and to convey the scope of the disclosure completely to those skilled in the art.

A number of specific details are given below to provide a more thorough understanding of the disclosure. However, it is apparent to those skilled in the art that the disclosure may be implemented without one or more of these details. In other examples, some technical features known in the art are not described to avoid confusion with the disclosure; namely, not all the features of the actual embodiments are described here, nor are known functions and structures described in detail.

In the drawings, dimensions of layers, areas, components and their relative dimensions may be exaggerated for clarity. The same reference number throughout indicates the same component.

It is to be understood that, when an element or layer is described as "above", "adjacent to", "connected to", or "coupled to" another element or layer, the element or layer may be directly above, adjacent to, connected to or coupled to the other element or layer, or there may be an intermediate element or layer. On the contrary, when an element is described as "directly on", "directly adjacent to", "directly connected to" or "directly coupled to" another element or layer, there is no intermediate element or layer. It is to be understood that, although various elements, components, regions, layers and/or parts may be described with terms first, second, third, etc., these elements, components, regions, layers and/or parts should not be limited to these terms. These terms are used only to distinguish one element, component, region, layer or part from another element, component, region, layer or part. Therefore, a first element, component, region, layer or part discussed below may be represented as a second element, component, region, layer or part without departing from the teaching of the disclosure. Moreover, when discussing a second element, component, region, layer or part, it does not necessarily imply the existence of a first element, component, region, layer or part in the disclosure.

For convenience of description, spatially relational terms such as "below", "under", "lower", "beneath", "above", and "upper" may be used herein to describe a relationship between one element or feature and another element or feature illustrated in the drawings. It is to be understood that, in addition to the orientation shown in the figures, the spatially relational terms are intended to further include different orientations of devices in use and operation. For example, if the devices in the figures are turned over, elements or features described as being "under" or "beneath" or "below" other elements or features will be oriented to be "on" the other elements or features. Therefore, the exemplary terms "under" and "below" may include both upper and lower. The device may be otherwise oriented (rotated by 90 degrees or in other orientations) and the spatially relational terms used herein may be interpreted accordingly.

The terms used herein are intended to describe specific embodiments only and not intended to limit the disclosure. As used herein, "a", "an", and "the" in a singular form are also intended to include the plural, unless otherwise specified in the context. It is also to be understood that, when terms "comprise" and/or "include" are used in this specification, the presence of the features, integers, steps, operations, elements, and/or components is determined, but the presence or addition of one or more other features, integers, steps, operations, elements, components, and/or groups is also possible. As used herein, term "and/or" includes any and all combinations of the related listed items.

A semiconductor structure, such as a Dynamic Random Access Memory (DRAM), usually has a basic memory unit of 1T1C (one transistor-one capacitor), which occupies a large area and has a low space utilization rate.

Moreover, a One Transistor-Zero Capacitor Dynamic Random Access Memory (1T0C DRAM) stores charges using a float body effect of a Vertical Gate-All-Around (VGAA) to cause Vt shift, so as to distinguish whether the memory state is "1" or "0".

However, there is only a theoretical possibility of using the float body effect to store charges, and it is difficult to be implemented in the practical application of the VGAA at present. How to balance the space utilization ratio and the feasibility of 1T0C has become an urgent problem to be solved in constructing a three-dimensional DRAM.

Based thereon, the following technical solution of the embodiments of the disclosure is proposed. Specific implementations of the disclosure will be described below in detail in combination with the accompanying drawings. For convenience of explanation, when the embodiment of the disclosure is detailed, the schematic diagram may be partially enlarged not according to a general scale, and the schematic diagram is only exemplary, which shall not limit the scope of protection of the present disclosure here.

Figure 1:
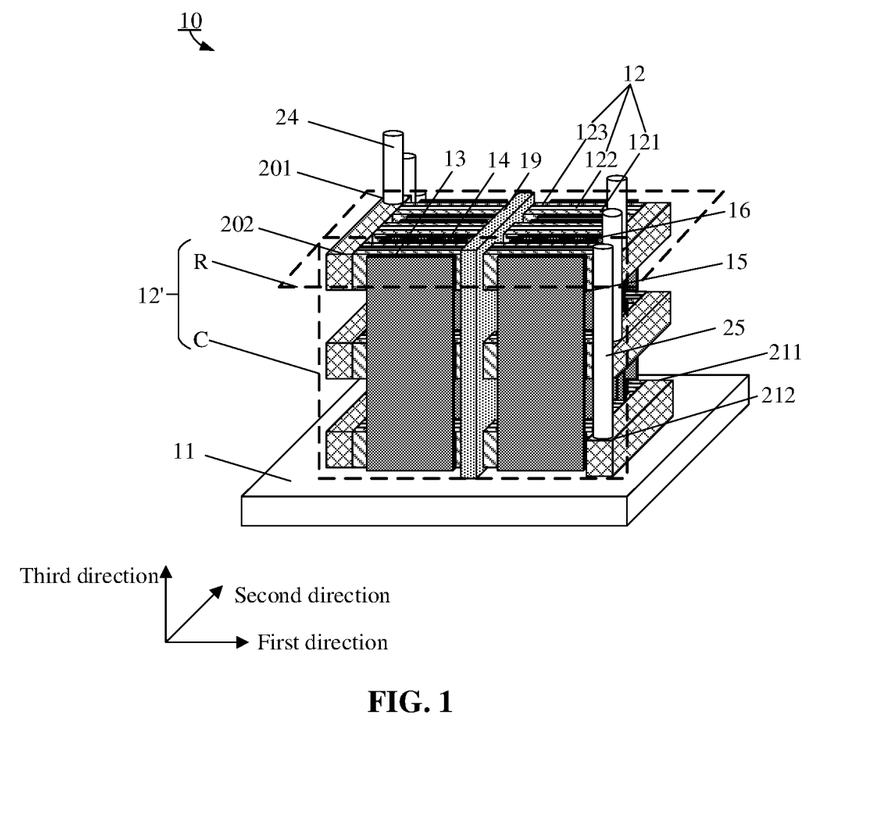
FIG. 1 is a three-dimensional schematic diagram of a semiconductor device according to an embodiment of the disclosure.
Figure 2:
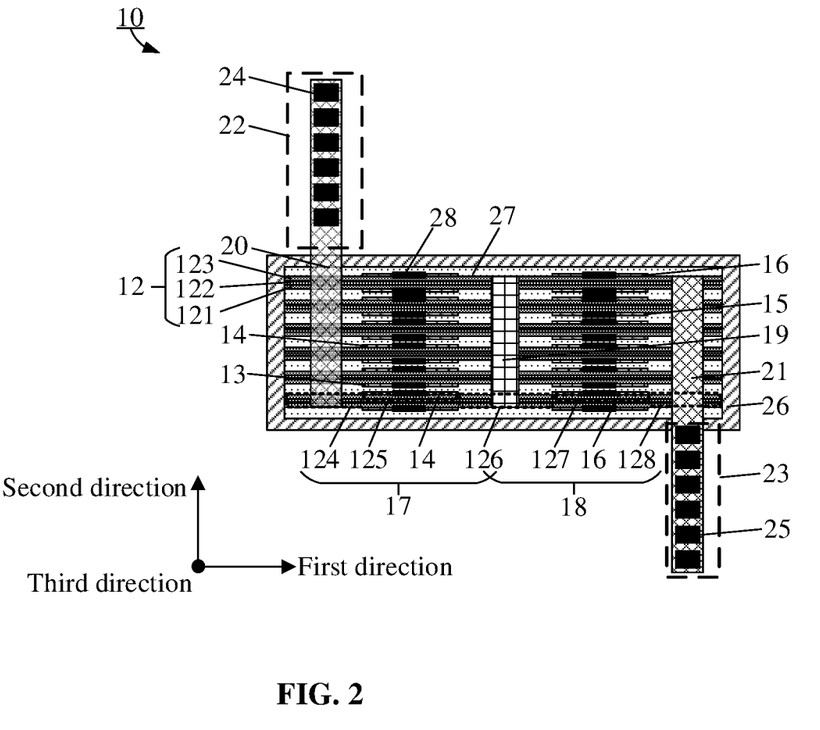
FIG. 2 is a schematic plan view of a semiconductor device according to an embodiment of the disclosure.

FIG. 1 is a three-dimensional schematic diagram of a semiconductor device according to an embodiment of the disclosure. FIG. 2 is a schematic plan view of a semiconductor device according to an embodiment of the disclosure. Further description is made below to the semiconductor device in the embodiment of the disclosure with reference to FIGS. 1 and 2.

The embodiment of the disclosure provides a semiconductor device 10. As shown in FIGS. 1 and 2, the semiconductor device 10 includes: a substrate 11, an active pillar array structure 12' located on the substrate 11, and a plurality of first word lines 13 and a plurality of second word lines 14. The active pillar array structure 12' includes a plurality of active pillars 12 arrayed in a second direction and a third direction. Each active pillar 12 extends in a first direction. The first direction is parallel to the substrate plane, the second direction is parallel to the substrate plane and perpendicular to the first direction, and the third direction is perpendicular to the substrate plane. The active pillar includes a first semiconductor layer 121, a second semiconductor layer 122 and a third semiconductor layer 123 stacked sequentially in the second direction. The first word lines 13 and the second word lines 14 extend in the third direction, and each column of the active pillars 12 arranged in the third direction corresponds to a respective one of the plurality of first word lines 13 and a respective one of the plurality of second word lines 14. Each of the first word lines 13 covers the first semiconductor layer 121 in the active pillar 12 corresponding to the first word line, and each of the second word lines 14 covers the third semiconductor layer 123 in the active pillar 12 corresponding to the second word line. A row of multiple active pillars 12 arranged in the second direction in the active pillar array structure 12' constitute an active pillar row R; and a column of multiple active pillars 12 arranged in the third direction in the active pillar array structure 12' constitute an active pillar column C.

Each active pillar in the semiconductor device provided by the embodiment of the disclosure corresponds to a respective first word line and a respective second word line, so that the formed transistor may include a front gate and a back gate. Herein, the first word line may correspond to the front gate, and the second word line may correspond to the back gate. The front gate structure is used as a switching element, and the back gate structure is used for storing charges by using the float body effect, thus realizing a 1T0C architecture and greatly improving the space utilization rate. A plurality of active pillars extend in the direction parallel to the substrate plane, which may further increase the integration level. Meanwhile, the active pillar includes a first semiconductor layer, a second semiconductor layer and a third semiconductor layer stacked in sequence in the second direction, so that a heterojunction may be formed, and excess holes may be accumulated using a quantum well of the heterojunction, so that a junction leakage is reduced and a data retention time is increased.

In actual operation, the substrate 11 may be a semiconductor substrate and may include at least one elemental semiconductor material (such as a silicon (Si) substrate and a germanium (Ge) substrate), at least one III-V compound semiconductor material, at least one II-VI compound semiconductor material, at least one organic semiconductor material or other semiconductor materials known in the art. In a specific embodiment, the substrate is the Si substrate, and the Si substrate may be doped or undoped. The materials of the first word line 13 and the second word line 14 include a conductive material. The conductive material includes but is not limited to wolfram, copper, titanium, tantalum, titanium nitride, tantalum nitride, metal silicide, metal alloy or any combination thereof.

In some embodiments, a band gap of the second semiconductor layer 122 is smaller than band gaps of the first semiconductor layer 121 and the third semiconductor layer 123. Thus, the second semiconductor layer 122 may form a quantum well to obtain a storage pocket, which is used to accumulate excess holes. Compared with the case without a quantum well, the hole accumulation position is closer to the front gate, so that the junction leakage is reduced and the data retention time is increased.

In some embodiments, the first semiconductor layer and the third semiconductor layer include silicon, and the second semiconductor layer includes silicon germanium. The materials of the first semiconductor layer, the second semiconductor layer and the third semiconductor layer may also include other III-V elements.

In some embodiments, a proportion of germanium in the silicon germanium ranges from 45% to 85%. Exemplarily, the proportion of germanium in the silicon germanium may range from 58% to 76%. Here, too low a proportion of germanium makes it difficult to form a quantum well that effectively confines a carrier, while too high a proportion of germanium leads to increased process difficulty and unstable structure.

In some embodiments, the proportion of germanium in the silicon germanium gradually decreases in the second direction from the center towards the first semiconductor layer and towards the third semiconductor layer. In this way, a transition of stress, thermal expansion coefficient, etc., in the silicon germanium is more uniform. In other embodiments, the proportion of germanium in the silicon germanium gradually decreases in the second direction from the side close to the third semiconductor layer toward the first semiconductor layer. Thus, the band gap of the second semiconductor layer located on the side close to the third semiconductor layer is smaller.

Figure 4:
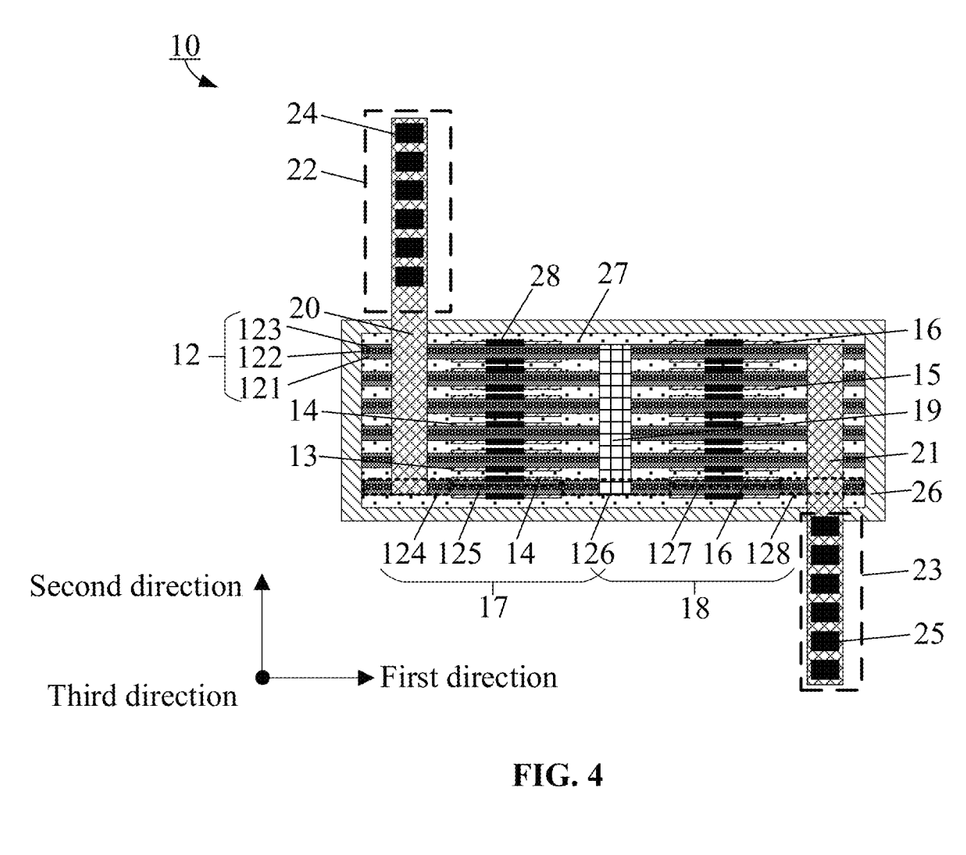
FIG. 4 is a schematic plan view of a semiconductor device according to an embodiment of the disclosure.

In some embodiments, as shown in FIG. 2, the thickness of the first semiconductor layer 121 is equal to the thickness of the third semiconductor layer 123 in the second direction. On the one hand, reduction of the difficulty of the process is facilitated; on the other hand, the stability of the structure is improved. The disclosure is not limited thereto. In other embodiments, as shown in FIG. 4, the thickness of the first semiconductor layer 121 is greater than the thickness of the third semiconductor layer 123 in the second direction. Thus, the third semiconductor layer close to the back gate is made thinner, so that the second semiconductor layer can realize a memory function with the quantum well. In actual operation, a ratio of the thickness of the first semiconductor layer to the thickness of the active pillar ranges from 1/3 to 1/2 in the second direction, for example, possibly 2/5 or 5/12. A ratio of the thickness of the third semiconductor layer to the thickness of the active pillar ranges from 1/10 to 1/4, for example, possibly 1/5 or 1/8. In actual operation, the thickness of the active pillar in the second direction may range from 30 nm to 100 nm, for example, possibly 48 nm, 60 nm or 72 nm. In some embodiments, the thickness of the active pillar in the second direction is 100 nm, and the thickness of the third semiconductor layer is 10 nm.

In some embodiments, as shown in FIGS. 1 and 2, the semiconductor device further includes: a plurality of third word lines 15 and a plurality of fourth word lines 16. The third word lines 15 and the fourth word lines 16 extend in the third direction. Each column of the active pillars 12 arranged in the third direction corresponds to a respective one of the third word lines 15 and a respective one of the fourth word lines 16. Each of the third word lines 15 covers the first semiconductor layer 121 in the active pillar 12 corresponding to the third word line, and each of the fourth word lines 16 covers the third semiconductor layer 123 in the active pillar 12 corresponding to the fourth word line. The third word line 15 and the first word line 13 are spaced apart in the first direction, and the fourth word line 16 and the second word line 14 are spaced apart in the first direction. The materials of the third word line 15 and the fourth word line 16 include a conductive material. The conductive material includes but is not limited to wolfram, copper, titanium, tantalum, titanium nitride, tantalum nitride, metal silicide, metal alloy or any combination thereof.

In some embodiments, as shown in FIG. 2, the active pillar 12 sequentially includes a first doped region 124, a first channel region 125, a co-doped region 126, a second channel region 127 and a second doped region 128 in the first direction. The first channel region 125 and the second channel region 127 are respectively covered by the second word line 14 and the fourth word line 16. The first doped region 124, the first channel region 125, the co-doped region 126 and the second word line 14 constitute a first transistor 17, and the co-doped region 126, the second channel region 127, the second doped region 128 and the fourth word line 16 constitute a second transistor 18. The co-doped region 126 serves as a common source/drain of the first transistor 17 and the second transistor 18, and the first doped region 124 and the second doped region 128 serve as the drain/source of the first transistor 17 and the drain/source of the second doped region 128, respectively. In this way, the same active pillar forms two transistors sharing the source/drain, which may further increase the integration level of the device. In actual operation, the first doped region, the first channel region, the co-doped region, the second channel region and the second doped region may be formed into an N-type doped region by doping an n-type dopant such as phosphorus, arsenic, another n-type dopant or a combination thereof, and may be formed into a P-type doped region by doping a p-type dopant such as boron, indium, another p-type dopant or a combination thereof. The first doped region, the co-doped region and the second doped region have the same doping ion type. The doping ion types of the first channel region and the second channel region are the same. The doping ion types of the first channel region and the second channel region are opposite to the doping ion types of the first doped region, the co-doped region and the second doped region.

In some embodiments, as shown in FIGS. 1 and 2, the semiconductor device further includes a conductive layer 19. The conductive layer 19 is perpendicular to the substrate plane and electrically connected to all the co-doped regions 126 in the active pillar array structure 12'. Here, a material of the conductive layer includes at least one of conductive materials such as polysilicon. For example, the material of the conductive layer includes one or more of polysilicon, Wolfram (W), Copper (Cu), Titanium (Ti), Tantalum (Ta), Titanium Nitride (TiN), Tantalum Nitride (TaN), metal silicide and metal alloy.

In some embodiments, as shown in FIGS. 1 and 2, the semiconductor device further includes: a plurality of first bit lines 20 and a plurality of second bit lines 21. Each of the plurality of first bit lines 20 extends in the second direction, and the plurality of first bit lines are sequentially arranged in the third direction. Each of the plurality of second bit lines 21 extends in the second direction, and the plurality of second bit lines are sequentially arranged in the third direction. Each row of the active pillars 12 arranged in the second direction corresponds to a respective one of the plurality of first bit lines 20 and a respective one of the plurality of second bit lines 21. Each of the plurality of first bit lines is connected to first ends of a plurality of active pillars 12 in the active pillars 12 corresponding to the first bit line, and each of the plurality of second bit lines is connected to second ends of a plurality of active pillars 12 in the active pillars 12 corresponding to the second bit line. Materials of the first bit line and the second bit line include a conductive material. The conductive material includes but is not limited to wolfram, copper, titanium, tantalum, titanium nitride, tantalum nitride, metal silicide, metal alloy or any combination thereof.

In some embodiments, the semiconductor device includes m first bit lines 20 and m second bit lines 21, where m is a positive integer greater than 1. In the second direction, each of the plurality of first bit lines 20 sequentially includes a first end 201 and a second end 202, and each of the plurality of second bit lines 21 sequentially includes a third end 211 and a fourth end 212. An extension length of the first end 201 of the first bit line 20 located on the lower side is larger than that of the first end 201 of the first bit line 20 located on the upper side. The first ends 201 of the m first bit lines 20 constitute a first staircase structure 22. An extension length of the fourth end of the second bit line located on the lower side is larger than an extension length of the fourth end of the second bit line located on the upper side. The fourth ends 212 of the m second bit lines constitute a second staircase structure 23. Here, the first bit line and the second bit line may efficiently select appropriate transistors to apply voltages through the first staircase structure and the second staircase structure, which improves the integration level of the device.

With reference to the figure, taking m=3 as an example, the extension length of the first end 201 of the third one of the first bit lines 20 located at the bottommost is greater than the extension length of the first end 201 of the second one of the first bit lines 20 located at the middle, and the extension length of the first end 201 of the second one of the first bit lines 20 located at the middle is greater than the extension length of the first end 201 of the first one of the first bit lines 20 located at the uppermost. The first ends 201 of the three first bit lines 20 constitute the first staircase structure 22.

In some embodiments, the semiconductor device further includes: a plurality of first contact plugs 24 and a plurality of second contact plugs 25. Each of the plurality of first contact plugs 24 is electrically connected to a respective one of the first ends 201 in the first staircase structure 22. Each of the plurality of second contact plugs 25 is electrically connected to a respective one of the fourth ends 212 in the second staircase structure 23. The materials of the first contact plug and the second contact plug may be conductive materials, including but not limited to Wolfram (W), Cobalt (Co), Copper (Cu), Aluminum (Al), polysilicon, doped silicon, silicide or any combination thereof.

In some embodiments, the semiconductor device further includes a frame 26. A front projection of the frame 26 on the substrate plane surrounds a front projection of the active pillar array structure 12' on the substrate plane, and front projections of the first staircase structure 22 and the second staircase structure 23 on the substrate plane are outside the front projection of the frame 26. The frame may effectively provide physical protection for the active pillar array structure and prevent the active pillar array structure from being attacked by external force or moisture. The material of the frame may include, for example, silicon nitride or silicon oxide.

In some embodiments, the semiconductor device further includes: a first gate dielectric layer (not shown in the figure) covering the first semiconductor layer and a second gate dielectric layer (not shown in the figure) covering the third semiconductor layer. The first gate dielectric layer is located between the first word line/third word line and the active pillar, and the second gate dielectric layer is located between the second word line/fourth word line and the active pillar. Here, materials of the first gate dielectric layer and the second gate dielectric layer may be the same, and the materials of the first gate dielectric layer and the second gate dielectric layer include an oxide.

In some embodiments, referring to FIG. 2, the semiconductor device further includes: a filling layer 27 disposed in a gap between adjacent active pillars 12. A material of the filling layer includes an oxide, for example, silicon oxide.

In some embodiments, referring to FIG. 2, the semiconductor device further includes a plurality of word line contact plugs 28. Each of the plurality of word line contact plugs 28 is electrically connected to a respective one of the first word lines, the second word lines, the third word lines or the fourth word lines. A material of the word line contact plug may be, for example, a conductive material, including but not limited to Wolfram (W), Cobalt (Co), Copper (Cu), Aluminum (Al), polysilicon, doped silicon, silicide or any combination thereof.

Figure 3:
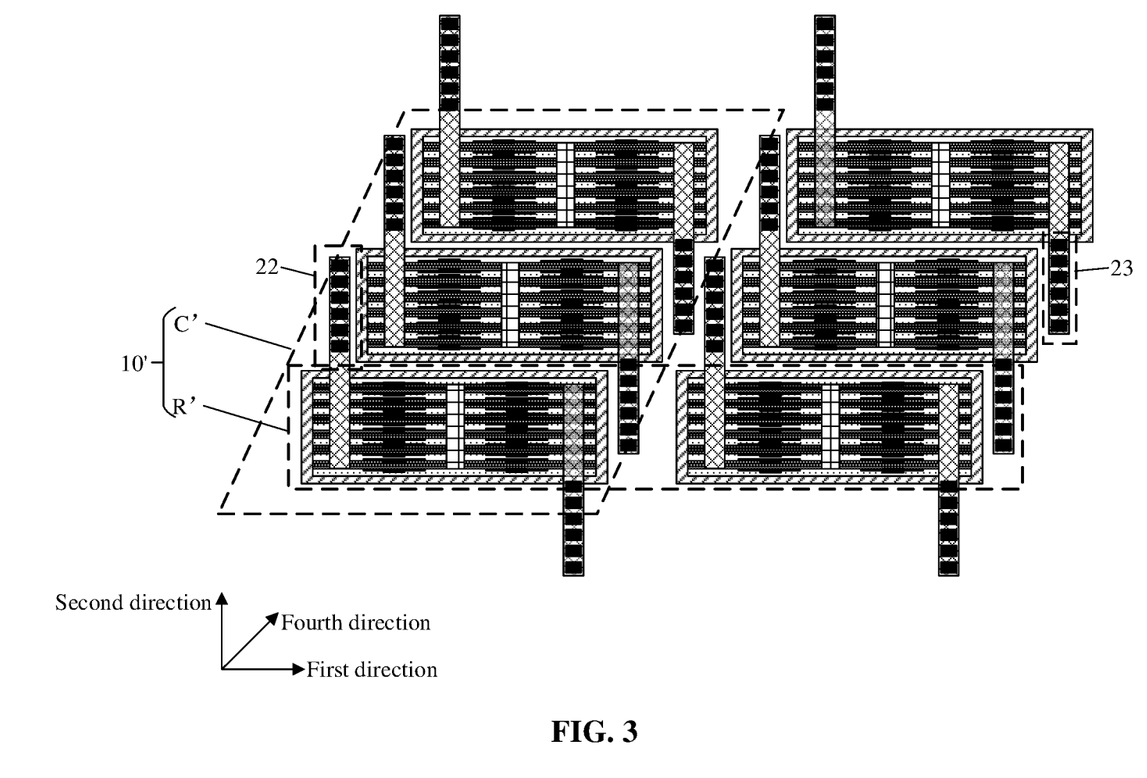
FIG. 3 is a schematic plan view of a semiconductor structure according to an embodiment of the disclosure.

The embodiment of the disclosure further provides a semiconductor structure. As shown in FIG. 3, FIG. 3 is a schematic plan view of a semiconductor structure according to an embodiment of the disclosure. The semiconductor structure includes a semiconductor device array 10'. The semiconductor device array includes a plurality of semiconductor devices 10 described in any of the above embodiments.

In some embodiments, as shown in FIG. 3, the semiconductor device array 10' includes a plurality of semiconductor devices 10 arrayed in a first direction and a fourth direction, and the fourth direction is parallel to the substrate plane and intersects but is not perpendicular to the first direction.

In some embodiments, as shown in FIG. 3, a row of multiple semiconductor devices 10 arranged in the first direction in the semiconductor device array 10' constitute a semiconductor device row R', and a column of multiple semiconductor devices 10 arranged in the fourth direction in the semiconductor device array 10' constitute a semiconductor device column C'. The semiconductor structure includes M semiconductor device rows R' and N semiconductor device columns C', where M and N are positive integers greater than 1. A center of the semiconductor device 10 on the ith column and the (j+1)th row is offset in the first direction with respect to a center of the semiconductor device 10 on the ith column and the jth row, where i is a positive integer smaller than N, and j is a positive integer smaller than M. Thus, a space where the offset exists may be reserved to increase the space utilization rate of the device.

With reference to FIG. 3, taking M=3, N=2, i=1, and j=1 as an example, the semiconductor structure includes three semiconductor device rows R' and two semiconductor device columns C'. The center of the semiconductor device 10 on the first column and the second row is offset in the first direction with respect to the center of the semiconductor device 10 on the first column and the first row. Thus, the first staircase structure of the semiconductor device on the first column and the first row may be arranged in the space where the offset exists, thereby increasing the space utilization rate.

In some embodiments, as shown in FIG. 3, the first staircase structure 22 of the semiconductor device 10 on the ith row and the (j+1)th column is located between the active pillar array structure 12' of the semiconductor device 10 on the (i+1)th row and the jth column and the active pillar array structure of the semiconductor device on the (i+1)th row and the (j+1)th column. The second staircase structure 23 of the semiconductor device on the (i+1)th row and the jth column is located between the active pillar array structure of the semiconductor device on the ith row and the jth column and the active pillar array structure of the semiconductor device on the ith row and the (j+1)th column.

With reference to FIG. 3, taking i=1 and j=1 as an example, the first staircase structure 22 of the semiconductor device 10 on the first row and the second column is located between the active pillar array structure 12' of the semiconductor device 10 on the second row and the first column and the active pillar array structure of the semiconductor device on the second row and the second column. The second staircase structure 23 of the semiconductor device on the second row and the first column is located between the active pillar array structure of the semiconductor device on the first row and the first column and the active pillar array structure of the semiconductor device on the first row and the second column.

In some embodiments, as shown in FIG. 3, an extension length of the first staircase structure 22 or the second staircase structure 23 in the second direction is less than or equal to an extension length of the active pillar array structure 12' in the second direction. The extension lengths of the first staircase structure 22 and the second staircase structure 23 in the second direction are prevented from being too large to intersect with the semiconductor device row C' composed of a plurality of semiconductor devices 10.

The embodiment of the disclosure further provides a method for operating a semiconductor device. Based on the semiconductor device in any of the above embodiments, the semiconductor device includes a plurality of transistors, and a respective first word line and a respective second word line electrically connected to each transistor. The operating method includes that: a to-be-programmed or to-be-read transistor is selected, a first voltage is applied to the first word line electrically connected to the to-be-programmed or to-be-read transistor, and a second voltage is applied to the second word line electrically connected to the to-be-programmed or to-be-read transistor. The second voltage is greater than a turn-on voltage of the transistor, and voltage directions of the first voltage and the second voltage are opposite.

Exemplarily, with reference to FIGS. 1 and 2, in the operation of programming a memory state of "1", a to-be-programmed transistor is selected, a first voltage is applied to a first word line electrically connected to the to-be-programmed transistor, and the first voltage may be, for example, 1V. A second voltage is applied to a second word line electrically connected to the to-be-programmed transistor, and the second voltage may be, for example, −1.5V. A third voltage is applied to a bit line electrically connected to the to-be-programmed transistor, the third voltage may be, for example, 1.2V, and the bit line may be electrically connected to the drain of the transistor. A fourth voltage is applied to a conductive layer electrically connected to the to-be-programmed transistor, the fourth voltage may be, for example, 0V, and the conductive layer may be electrically connected to the source of the transistor. Here, the first voltage is greater than the turn-on voltage of the transistor to turn on the transistor. The third voltage is greater than the fourth voltage to form a potential difference to generate a floating body, and the floating body may be, for example, a hole. The voltage directions of the first voltage and the second voltage are opposite to each other, such that the floating body is kept in the second semiconductor layer.

In the operation of programming a memory state of "0", a to-be-programmed transistor is selected, a first voltage is applied to a first word line electrically connected to the to-be-programmed transistor, and the first voltage may be, for example, −1.5V. A second voltage is applied to a second word line electrically connected to the to-be-programmed transistor, and the second voltage may be, for example, 1.5V. A third voltage is applied to a bit line electrically connected to the to-be-programmed transistor, the third voltage may be, for example, −1.5V, and the bit line may be electrically connected to the drain of the transistor. A fourth voltage is applied to a conductive layer electrically connected to the to-be-programmed transistor, the fourth voltage may be, for example, 0V, and the conductive layer may be electrically connected to the source of the transistor. Here, the first voltage is greater than the turn-on voltage of the transistor to turn on the transistor. The third voltage is less than the fourth voltage to form a potential difference, such that the floating body can be released.

In some embodiments, in the operation of data retention, a first voltage is applied to a first word line electrically connected to a to-be-read transistor, and the first voltage may be, for example, 0V. A second voltage is applied to a second word line electrically connected to the to-be-read transistor, and the second voltage may be, for example, −1.5V. A third voltage is applied to a bit line electrically connected to the to-be-read transistor, the third voltage may be, for example, 0V, and the bit line may be electrically connected to the drain of the transistor. A fourth voltage is applied to a conductive layer electrically connected to the to-be-read transistor, the fourth voltage may be, for example, 0V, and the conductive layer may be electrically connected to the source of the transistor. By applying a negative bias voltage to the second word line electrically connected to a back gate of a programmed transistor, it is ensured that holes remain accumulated in the second semiconductor layer close to the back gate, so that the transistor realizes the memory function.

In the reading operation, a to-be-read transistor is selected. A first voltage is applied to a first word line electrically connected to the to-be-read transistor, and the first voltage may be, for example, 0.8V. A second voltage is applied to a second word line electrically connected to the to-be-read transistor, and the second voltage may be, for example, −1.5V. A third voltage is applied to a bit line electrically connected to the to-be-read transistor, the third voltage may be, for example, 0.2V, and the bit line may be electrically connected to the drain of the transistor. A fourth voltage is applied to a conductive layer electrically connected to the to-be-read transistor, the fourth voltage may be, for example, 0V, and the conductive layer may be electrically connected to the source of the transistor. Here, the first voltage is greater than the turn-on voltage of the transistor to turn on the transistor. The voltage directions of the first voltage and the second voltage are opposite to each other, such that the floating body may be kept in the second semiconductor layer close to the second word line. The third voltage is greater than the fourth voltage to form a potential difference, and the memory state of the transistor is determined by the current generated by the potential difference. Herein, the current generated by the memory state "1" is greater than the current generated by the memory state "0".

As can be seen, each active pillar in the semiconductor device provided by the embodiments of the disclosure corresponds to a respective first word line and a respective second word line, so that the formed transistor may include a front gate and a back gate. The front gate structure is used as a switching element, and the back gate structure is used to store charges by using the float body effect, thus realizing a 1T0C architecture and greatly improving the space utilization rate. A plurality of active pillars extend in the direction parallel to the substrate plane, which may further increase the integration level. Meanwhile, the active pillar includes a first semiconductor layer, a second semiconductor layer and a third semiconductor layer stacked in sequence in the second direction, so that a heterojunction may be formed, and excess holes may be accumulated by using a quantum well of the heterojunction, so that the junction leakage is reduced and the data retention time is increased.

Described above are merely optional embodiments of the disclosure and not intended to limit the protection scope of the disclosure. Any modifications, equivalent replacements, improvements and the like made within the spirit and principle of the disclosure shall fall within the protection scope of the disclosure.

INDUSTRIAL APPLICABILITY

Each active pillar in the semiconductor device provided by the embodiments of the disclosure corresponds to a respective first word line and a respective second word line, so that the formed transistor may include a front gate and a back gate. The front gate structure is used as a switching element, and the back gate structure is used to store charges by using a float body effect, thus realizing a 1T0C architecture and greatly improving the space utilization rate. A plurality of active pillars extend in the direction parallel to the substrate plane, which may further increase the integration level. Meanwhile, the active pillar includes a first semiconductor layer, a second semiconductor layer and a third semiconductor layer stacked in sequence in the second direction, so that a heterojunction may be formed, and excess holes may be accumulated by using a quantum well of the heterojunction, so that the junction leakage is reduced and the data retention time is increased.

The invention claimed is:

1. A semiconductor device, comprising:
a substrate;
an active pillar array structure located on the substrate, the active pillar array structure comprising a plurality of active pillars arrayed in a second direction and a third direction, each of the plurality of active pillars extending in a first direction, the first direction being parallel to a substrate plane, the second direction being parallel to the substrate plane and perpendicular to the first direction, and the third direction being perpendicular to the substrate plane, wherein
each of the plurality of active pillars comprises a first semiconductor layer, a second semiconductor layer and a third semiconductor layer stacked sequentially in the second direction;
a plurality of first word lines and a plurality of second word lines, the plurality of first word lines and the plurality of second word lines extending in the third direction, each column of the active pillars arranged in the third direction corresponding to a respective one of the plurality of first word lines and a respective one of the plurality of second word lines, each of the plurality of first word lines covering the first semiconductor layer in the active pillar corresponding to the first word line, and each of the plurality of second word lines covering the third semiconductor layer in the active pillar corresponding to the second word line; and
a plurality of third word lines and a plurality of fourth word lines, the plurality of third word lines and the plurality of fourth word lines extending in the third direction, each column of the active pillars arranged in the third direction corresponding to a respective one of the plurality of third word lines and a respective one of the plurality of fourth word lines, each of the plurality of third word lines covering the first semiconductor layer in the active pillar corresponding to the third word line, each of the plurality of fourth word lines covering the third semiconductor layer in the active pillar corresponding to the fourth word line the plurality of third word lines and the plurality of first word lines being spaced apart in the first direction, and the plurality of fourth word lines and the plurality of second word lines being spaced apart in the first direction;
wherein each of the plurality of active pillars sequentially comprises a first doped region, a first channel region, a co-doped region, a second channel region and a second doped region in the first direction, the first channel region and the second channel region are respectively covered by a second word line in the plurality of second word lines and a fourth word line in the plurality of fourth word lines, the first doped region, the first channel region, the co-doped region and the second word line constitute a first transistor, the co-doped region, the second channel region the second doped region and the fourth word line constitute a second transistor, the co-doped region serves as a common source/drain of the first transistor and the second transistor, and the first doped region and the second doped region serve as a drain/source of the first transistor and a drain/source of the second transistor, respectively.

2. The semiconductor device of claim 1, wherein a band gap of the second semiconductor layer is smaller than band gaps of the first semiconductor layer and the third semiconductor layer.

3. The semiconductor device of claim 2, wherein
the first semiconductor layer and the third semiconductor layer comprise silicon, and the second semiconductor layer comprises silicon germanium.

4. The semiconductor device of claim 3, wherein
a proportion of germanium in the silicon germanium ranges from 45% to 85%.

5. The semiconductor device of claim 4, wherein
the proportion of germanium in the silicon germanium gradually decreases in the second direction from a center towards the first semiconductor layer and towards the third semiconductor layer, or
the proportion of germanium in the silicon germanium gradually decreasing in the second direction from a side close to the third semiconductor layer toward the first semiconductor layer.

6. The semiconductor device of claim 1, wherein
a thickness of the first semiconductor layer is greater than a thickness of the third semiconductor layer in the second direction.

7. A method for operating the semiconductor device according to claim 1, wherein each of the plurality of active pillars, together with a respective first word line and a respective second word line corresponding to the each of the plurality of active pillars, forms a transistor; wherein the method comprises:
selecting a to-be-programmed or to-be-read transistor;
applying a first voltage to a first word line or a third word line electrically connected to the to-be-programmed or to-be-read transistor; and
applying a second voltage to a second word line or a fourth word line electrically connected to the to-be-programmed or to-be-read transistor, wherein the second voltage is greater than a turn-on voltage of the transistor, and voltage directions of the first voltage and the second voltage are opposite.

8. The semiconductor device of claim 1, further comprising:
a conductive layer, perpendicular to the substrate plane and electrically connected to all co-doped regions in the active pillar array structure.

9. The semiconductor device of claim 1, further comprising:
a plurality of first bit lines, each of the plurality of first bit lines extending in the second direction, and the plurality of first bit lines being sequentially arranged in the third direction; and
a plurality of second bit lines, each of the plurality of second bit lines extending in the second direction, and the plurality of second bit lines being sequentially arranged in the third direction, wherein
each row of the active pillars arranged in the second direction corresponds to a respective one of the plurality of first bit lines and a respective one of the plurality of second bit lines, each of the plurality of first bit lines is connected to a first end of the active pillar corresponding to the first bit line, and each of the plurality of second bit lines is connected to a second end of the active pillar corresponding to the second bit line.

10. The semiconductor device of claim 9, wherein
the semiconductor device comprises m first bit lines and m second bit lines, m being a positive integer greater than 1, in the second direction, each of the m first bit lines comprises a first end and a second end, and each of the m second bit lines comprises a third end and a fourth end,
an extension length of a first end of a first bit line located on a lower side in the m first bit lines is larger than an extension length of a first end of a first bit line located on an upper side in the m first bit lines, and first ends of the m first bit lines constitute a first staircase structure,
an extension length of a fourth end of a second bit line located on a lower side in the m second bit lines is larger than an extension length of a fourth end of a second bit line located on an upper side in the m second bit lines, and fourth ends of the m second bit lines constitute a second staircase structure.

11. The semiconductor device of claim 10, further comprising:
a plurality of first contact plugs, each of the plurality of first contact plugs being electrically connected to a respective one of the first ends in the first staircase structure; and
a plurality of second contact plugs, each of the plurality of second contact plugs being electrically connected to a respective one of the fourth ends in the second staircase structure.

12. The semiconductor device of claim 11, further comprising:
a frame, wherein a front projection of the frame on the substrate plane surrounds a front projection of the active pillar array structure on the substrate plane, and front projections of the first staircase structure and the second staircase structure on the substrate plane are outside the front projection of the frame.

13. A semiconductor structure, comprising a semiconductor device array, wherein the semiconductor device array comprises a plurality of semiconductor devices, each of the plurality of semiconductor devices comprises:
a substrate;
an active pillar array structure located on the substrate, the active pillar array structure comprising a plurality of active pillars arrayed in a second direction and a third direction, each of the plurality of active pillars extending in a first direction, the first direction being parallel to a substrate plane, the second direction being parallel to the substrate plane and perpendicular to the first direction, and the third direction being perpendicular to the substrate plane, wherein
each of the plurality of active pillars comprises a first semiconductor layer, a second semiconductor layer and a third semiconductor layer stacked sequentially in the second direction;
a plurality of first word lines and a plurality of second word lines, the plurality of first word lines and the plurality of second word lines extending in the third direction, each column of the active pillars arranged in the third direction corresponding to a respective one of the plurality of first word lines and a respective one of the plurality of second word lines, each of the plurality of first word lines covering the first semiconductor layer in the active pillar corresponding to the first word line, and each of the plurality of second word lines covering the third semiconductor layer in the active pillar corresponding to the second word line; and
a plurality of third word lines and a plurality of fourth word lines, the plurality of third word lines and the plurality of fourth word lines extending in the third direction, each column of the active pillars arranged in the third direction corresponding to a respective one of the plurality of third word lines and a respective one of the plurality of fourth word lines, each of the plurality of third word lines covering the first semiconductor layer in the active pillar corresponding to the third word line, each of the plurality of fourth word lines covering the third semiconductor layer in the active pillar corresponding to the fourth word line, the plurality of third word lines and the plurality of first word lines being spaced apart in the first direction, and the plurality of fourth word lines and the plurality of second word lines being spaced apart in the first direction;

wherein each of the plurality of active pillars sequentially comprises a first doped region, a first channel region, a co-doped region, a second channel region and a second doped region in the first direction, the first channel region and the second channel region are respectively covered by a second word line in the plurality of second word lines and a fourth word line in the plurality of fourth word lines the first doped region, the first channel region, the co-doped region and the second word line constitute a first transistor, the co-doped region, the second channel region, the second doped region and the fourth word line constitute a second transistor, the co-doped region serves as a common source/drain of the first transistor and the second transistor, and the first doped region and the second doped region serve as a drain/source of the first transistor and a drain/source of the second transistor, respectively.

14. The semiconductor structure of claim 13, wherein the plurality of semiconductor devices are arrayed in the first direction and a fourth direction, the fourth direction being parallel to the substrate plane and intersecting but not perpendicular to the first direction.

15. The semiconductor structure of claim 14, wherein a row of multiple semiconductor devices arranged in the first direction in the semiconductor device array constitutes a semiconductor device row, and a column of multiple semiconductor devices arranged in the fourth direction in the semiconductor device array constitutes a semiconductor device column, the semiconductor structure comprises M semiconductor device rows and N semiconductor device columns, M and N being positive integers greater than 1, a center of a semiconductor device on the ith column and the (j+1)th row is offset in the first direction with respect to a center of a semiconductor device on the ith column and the jth row, i being a positive integer less than N, and j being a positive integer less than M.

16. The semiconductor structure of claim 15, wherein the semiconductor device further comprises m first bit lines and m second bit lines, m being a positive integer greater than 1, in the second direction, each of the m first bit lines comprises a first end and a second end, and each of the m second bit lines comprises a third end and a fourth end, an extension length of a first end of a first bit line located on a lower side in the m first bit lines is larger than an extension length of a first end of a first bit line located on an upper side in the m first bit lines, and first ends of the m first bit lines constitute a first staircase structure, an extension length of a fourth end of a second bit line located on a lower side in the m second bit lines is larger than an extension length of a fourth end of a second bit line located on an upper side in the m second bit lines, and fourth ends of the m second bit lines constitute a second staircase structure.

17. The semiconductor structure of claim 16, wherein a first staircase structure of a semiconductor device on the ith row and the (j+1)th column is located between an active pillar array structure of a semiconductor device on the (i+1)th row and the jth column and an active pillar array structure of a semiconductor device on the (i+1)th row and the (j+1)th column, and a second staircase structure of the semiconductor device on the (i+1)th row and the jth column is located between an active pillar array structure of a semiconductor device on the ith row and the jth column and an active pillar array structure of the semiconductor device on the ith row and the (j+1)th column.

18. The semiconductor structure of claim 17, wherein extension lengths of the first staircase structure and the second staircase structure in the second direction are less than or equal to an extension length of the active pillar array structure in the second direction.

* * * * *